United States Patent
Harnisch et al.

[15] 3,656,898
[45] Apr. 18, 1972

[54] TRANSFORMATION OF PHOSPHORUS COMPOUNDS OBTAINED AS BY-PRODUCTS

[72] Inventors: Heinz Harnisch, Lovenich near Cologne; Ursus Thummler, Hurth near Cologne; Karl Traulsen, Knapsack near Cologne; Gerhard Hartlapp, Hermulheim near Cologne, all of Germany

[73] Assignee: Knapsack Aktiengesellschaft, Knapsack near Cologne, Germany

[22] Filed: May 14, 1969

[21] Appl. No.: 853,994

Related U.S. Application Data

[63] Continuation of Ser. No. 519,946, Jan. 11, 1966, abandoned.

[30] Foreign Application Priority Data

Feb. 17, 1965 Germany..........................K 55 302

[52] U.S. Cl. ..............................................23/165
[51] Int. Cl. .............................................C01b 25/12
[58] Field of Search.....................................23/165

[56] References Cited

UNITED STATES PATENTS 3,050,374  8/1962  Burt et al. ..........................23/165 A
2,925,326  2/1960  Pieper et al............................23/165

Primary Examiner—Oscar R. Vertiz
Assistant Examiner—Charles B. Rodman
Attorney—Connolly and Hutz

[57] ABSTRACT

A process whereby substantially low-valent phosphorus-containing compounds in waste by-products obtained in the manufacture of mineral and organic phosphorus compounds are converted into useful phosphoric acid, polyphosphoric acid, or corresponding alkali metal salts thereof despite the presence of partially non-combustible material, organic pentavalent compounds, and non-phosphorus-containing compounds within said material; by introducing the by-products into an elemental phosphorus-oxygen flame having excess oxygen, the by-products being introduced in an amount so as not to exceed 50 percent by weight of the elemental phosphorus being burned in said flame.

8 Claims, No Drawings

TRANSFORMATION OF PHOSPHORUS COMPOUNDS OBTAINED AS BY-PRODUCTS

CROSS-REFERENCE TO RELATED APPLICATION

The present application is a continuation of U.S. application Ser. No. 519,946 filed Jan. 11, 1966, now abandoned.

The present invention relates to a process which enables phosphorus compounds, such as often obtained as by-products in the manufacture of mineral and organic phosphorus compounds and such as most frequently contain low-valent phosphorus, to be transformed into useful products. Such by-products could not be utilized heretofore for reasons of economy and because of undesirable contamination of the waste water and the atmosphere. It is, therefore, an object of the present invention to provide a process enabling such waste products to be utilized commercially.

It is already known that so-called phosphorus sludge of the emulsion type obtained on condensing phosphorus vapors resulting from phosphorus production by electrothermal means, can be subjected to combustion by means of a flame fed with pure liquid phosphorus and oxygen to be transformed into pure $P_4O_{10}$ or pure orthophosphoric acid. Still further, it has already been proposed to prepare phosphates by spraying a solution of an alkali metal hydroxide or carbonate and further alkali metal salts having a volatile anion into a phosphorus flame with the resultant formation of solutions of alkali metal phosphates when equivalent proportions of starting material are used.

It has now been found that phosphorus compounds obtained as by-products, such as mineral and organic phosphites, phosphates, phosphonates, hypophosphites, phosphorous acid, phosphines or the like, optionally contaminated with additional compounds free from phosphorus, can also readily be transformed into compounds of pentavalent phosphorus by being subjected to combustion by means of a flame fed with elementary phosphorus and a gas containing free oxygen in excess with respect to the phosphorus.

Depending on the reaction conditions and the phosphorus compounds to be transformed, either phosphoric acid or polyphosphoric acids or the alkali metal salts of such acids can be obtained provided that the $P_4O_{10}$ formed as an intermediary compound is transformed in conventional manner into the compounds mentioned above. It has unexpectedly been found that the smooth oxidation of phosphorus to $P_4O_{10}$ is not affected, that the phosphorus compounds to be transformed practically undergo complete oxidation to give compounds of pentavalent phosphorus, and that constituents of organic nature are entirely converted into $CO_2$. In other words the final products obtained are free from contaminants, such as organic substances, cracking products thereof, carbon or the like.

This considerable advantage of the process of the present invention could not be forseen since contrary to phosphorus sludge as previously used the substances transformed in the phosphorus flame are partially non-combustible and have no readily volatile anion unlike the compounds previously used. The phosphorus compounds to be transformed can be reacted in the phosphorus flame in proportions practically limited by the oxidizing capacity of the flame; generally, however, the phosphorus compounds should be used in a proportion not greater than 50 percent by weight, and preferably in a proportion of 9 to 15 percent by weight, referred to the elementary phosphorus.

When the starting compounds are used in liquid form, the phosphorus compounds should conveniently be mixed with molten phosphorus and the resulting mixture transformed in conventional manner with a gas containing free oxygen into compounds of pentavalent phosphorus.

The phosphorus compounds can be used in liquid form, i.e. in the form of a melt or solution or suspension in an aqueous or organic solvent, the concentration of the solution or suspension being not critical. When used in gas form, the phosphorus compounds are most conveniently injected centrally or from the outside into the phosphorus flame in a manner such that the total quantity of phosphorus compounds is introduced into the flame cone.

The same procedure is naturally also applicable to liquid compounds.

The percent by weight data indicated in the following examples are related to the elementary phosphorus used, and the reducing constituents are determined as $H_3PO_3$.

EXAMPLE 1

Transformation of Sodium Phosphite ($Na_2HPO_3$)

About 10.2 percent by weight of a 55 percent aqueous sodium phosphite solution were subjected for a period of time of 5½ hours to combustion with phosphorus and the resulting $P_4O_{10}$ was absorbed to produce polyphosphoric acid by the process described in U.S. Pat. No. 3,387,929.

As taught therein, the $P_4O_{10}$ was absorbed in two stages by means of phosphoric acid of low concentration. The bulk of heat set free during the combustion reaction was dissipated in a first zone while a portion of the $P_4O_{10}$ formed was absorbed concurrently therewith by causing phosphoric acid, which can be cooled by means of a suitable cooling system, to flow in a cycle I through the said zone. The balance portion of $P_4O_{10}$ was absorbed subsequently in a second zone and the residual reaction heat was absorbed concurrently therewith by causing polyphosphoric acid to travel in a cycle II through the said second zone and through an appropriate cooling system, the polyphosphoric acid containing $P_4O_{10}$ in a concentration higher than the acid cycled in cycle I.

The content of reducing substance in the polyphosphoric acid was:

|  | before addition | after addition |
|---|---|---|
| in cycle I | 0.15 % | 0.12 % |
| in cycle II | 0.003 % | 0.02 % |

Non-oxidation of the phosphite would have resulted in the content of reducing substance being increased in the two cycles to a value of 0.3 – 0.4 percent.

EXAMPLE 2

Transformation of Sodium Hyposphosphite ($NaH_2PO_2$)

About 11.1 percent by weight of a 50 percent aqueous sodium hypophosphite solution were added in measured quantities for a period of time of 3½ hours. The procedure was otherwise the same as that described in Example 1. The content of reducing substance in the polyphosphoric acid was:

|  | before addition | after addition |
|---|---|---|
| in cycle I | 0.05 % | 0.11 % |
| in cycle II | 0.02 % | 0.03 % |
| Theoretical value for non-oxidation: |  | 0.4–0.5 %. |

EXAMPLE 3

Transformation of a Waste Product Obtained in Phosphine Production.

The product was composed approximately of:
14 % $NaH_2PO_2$
9 % $Na_2HPO_3$
7 percent unknown phosphorus products
dissolved or suspended in a methanol/water-mixture.

9.1 percent by weight were added for a period of time of 4½ hours. The $P_4O_{10}$ was absorbed in the manner described in Example 1.

|  | before addition | after addition |
|---|---|---|
| in cycle I | 0.11 % | 0.13 % |
| in cycle II | 0.03 % | 0.05 %. |

EXAMPLE 4

Transformation of Organic Phosphite Waste.

A distillation residue was used which chiefly contained methyl phosphites and showed the following analytical data:

| | |
|---|---|
| total content of $P_4O_{10}$ | 76.8 % |
| reducing substance, determined iodometrically and calculated as $H_3PO_3$ | 41.0 % |
| total C-content | 9.5 % |

The $P_4O_{10}$ formed was absorbed in the manner described in Example 1. About 7.8 percent by weight were added for a period of time of 8 hours. The content of reducing substance in the polyphosphoric acid was:

| | before addition | after addition |
|---|---|---|
| in cycle I | 0.04 % | 0.03 % |
| Theoretical value for non-oxidation: | | 0.35 %. |

EXAMPLE 5

Transformation of $H_3PO_3$-waste.

A 70 percent aqueous solution of contaminated phosphorous acid was added to the phosphorus. About 10.9 percent by weight were added for a period of time of 4 hours. The $P_4O_{10}$ formed was absorbed in the manner described in Example 1.

The content of reducing substance in the polyphosphoric acid was:

| | before addition | after addition |
|---|---|---|
| in cycle I | 0.06 % | 0.05 % |
| in cycle II | 0.04 % | 0.02 % |
| Theoretical value for non-oxidation: | | 0.6–0.8 percent. |

EXAMPLE 6

Transformation of Organic Phosphite-waste by Separate Injection into the Phosphorus Flame.

The distillation residue of Example 4 was injected through a water-cooled nozzle into the cone of the phosphorus flame and the resulting $P_4O_{10}$ was absorbed in orthophosphoric acid.

9.3 percent by weight were added for a period of time of 11 hours.

The content of reducing substance in the orthophosphoricacid formed was:

| | |
|---|---|
| before the addition | 0.03 % |
| during and after the addition | 0.06–0.08 % |
| Theoretical value for non-oxidation: | 0.9 %. |

EXAMPLE 7

Transformation of Sodium Phosphite ($Na_2HPO_3$) for Making Molten Phosphates.

About 9.8 percent by weight of a 55 percent aqueous sodium phosphite solution were subjected for a period of time of 6 hours to combustion with phosphorus and the resulting $P_4O_{10}$ was absorbed for making sodium phosphates (molten phosphates) by the process disclosed in U.S. Pat. application Ser. No. 375,388, now abandoned.

The content of reducing substance in the phosphorus melt was:

| before addition | after addition |
|---|---|
| 0.01 % | 0.01 % |

Non-oxidation of the phosphite would have resulted in the content of reducing substance in the phosphate melt being increased to a value of 1.1 – 1.2 percent.

What is claimed is:

1. A process for transforming and recovering as pentavalent phosphorus compounds a phosphorus waste by-product capable of reducing phosphorus in compounds, the said waste product containing about 41 percent of reducing substances determined iodometrically and calculated as $H_3PO_3$ and consisting of a distillation residue of methyl phosphite which comprises introducing into a phosphorus oxygen flame the said waste by-product, the said phosphorus oxygen flame having excess oxygen with respect to the elementary phosphorus burned, the amount of waste by-products introduced into the flame not exceeding 50 percent by weight related to the elementary phosphorus burned to obtain the recoverable pentavalent phosphorus compounds.

2. The process as claimed in claim 1, wherein the waste products to be transformed are used in a proportion of 9 – 15 percent by weight, related to the elementary phosphorus.

3. A process as claimed in claim 1, wherein waste product compounds in liquid form are so injected into the phosphorus flame that the total quantity thereof is introduced into the flame cone.

4. A process as claimed in claim 1, wherein gaseous waste products are so injected into the phosphorus flame that the total quantity thereof is introduced into the flame cone.

5. A process as claimed in claim 1, wherein the waste products are introduced centrally into the phosphorus flame.

6. A process as claimed in claim 1, wherein the waste products are introduced from the outside into the phosphorus flame.

7. A process as claimed in claim 1, wherein the waste products are used in molten form.

8. A process as claimed in claim 1, wherein the waste products are used in the form of solutions and suspensions of aqueous and organic solvents.

* * * * *